April 10, 1951 T. L. HINTZ 2,548,262
GRAIN DEHYDRATOR AND MIXER
Filed Aug. 12, 1949 2 Sheets-Sheet 2
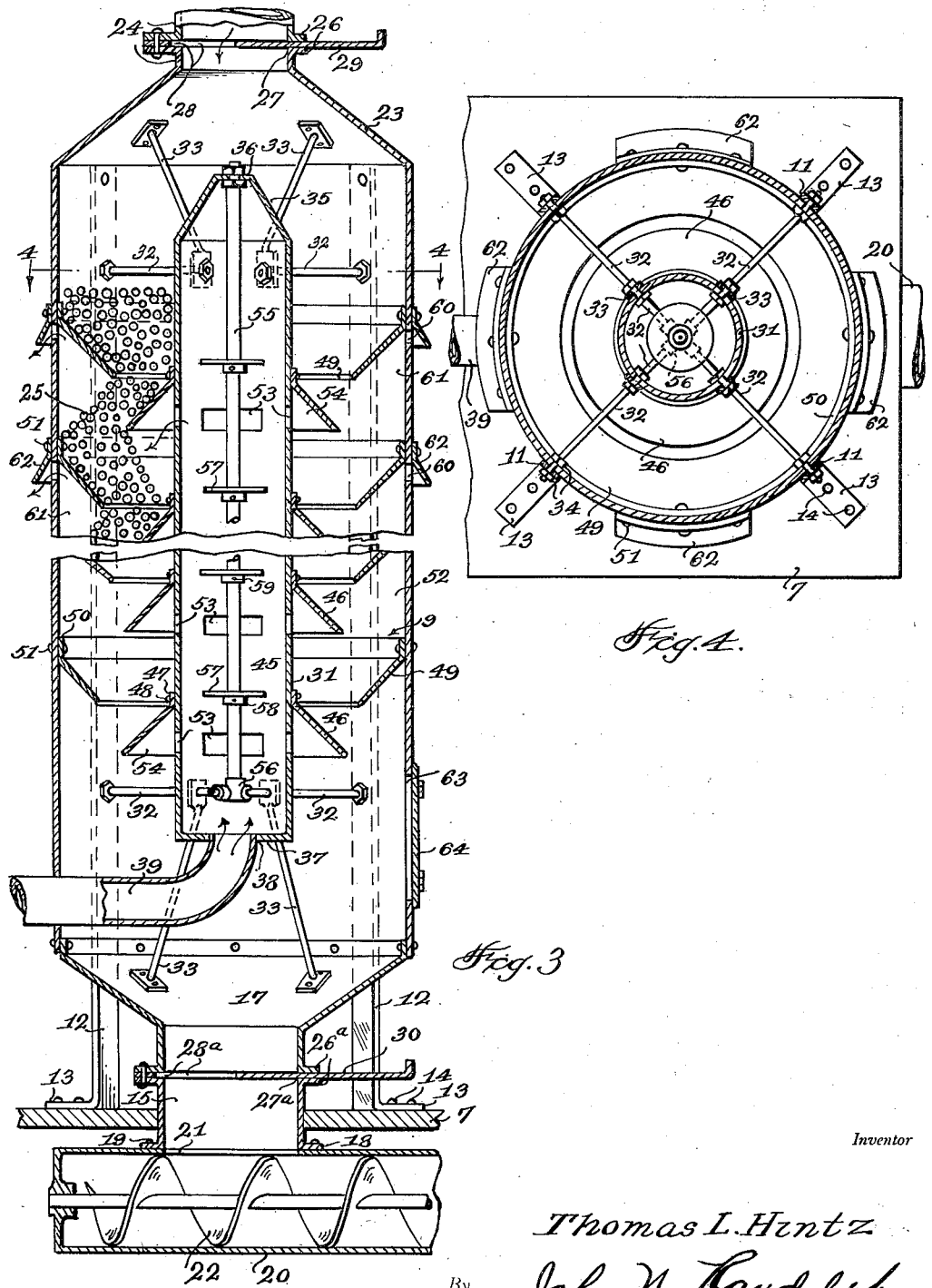
Inventor
Thomas L. Hintz
By John N. Randolph
Attorney Patented Apr. 10, 1951

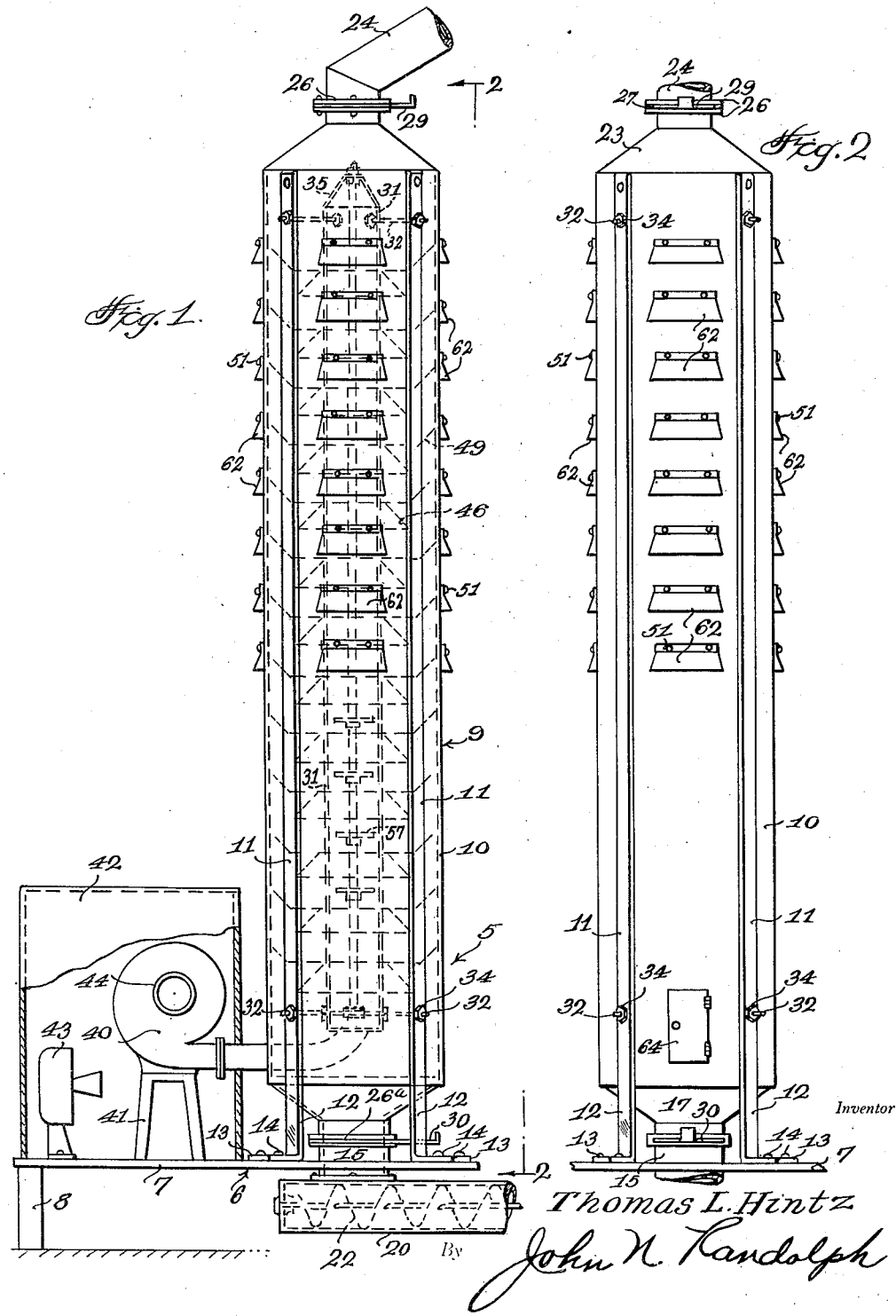

2,548,262

UNITED STATES PATENT OFFICE 2,548,262

GRAIN DEHYDRATOR AND MIXER

Thomas L. Hintz, Raymond, Minn.

Application August 12, 1949, Serial No. 109,880

2 Claims. (Cl. 34—171)

This invention relates to a novel construction of dehydrator and mixer for grain adapted primarily for outdoor use and comprising a tower through which the grain is conveyed downwardly by gravity while being subjected to hot air or other heated gases for thoroughly drying and dehydrating the grain.

Another object of the invention is to provide a dehydrator or mixer having means for deflecting the grain back and forth in an undulating path as it is fed downwardly by gravity for thoroughly mixing the grain and exposing all portions thereof to the dehydrating and drying action of the heated air or gases for uniformly mixing and drying the grain.

Still a further object of the invention is to provide a dehydrating and mixing apparatus including a tower having an outer annular upright chamber through which the grain is conveyed downwardly by gravity and an inner columnar chamber through which air or gases are conveyed upwardly and released into said outer annular chamber at vertically spaced points therealong for substantially uniformly drying the grain in its passage through the tower and which outer chamber is provided with means for causing the grain to be thoroughly mixed and agitated in its passage therethrough so that all portions thereof will be exposed to the heated air and gases.

Still a further object of the invention is to provide a dehydrating and mixing apparatus wherein the rate of flow can be readily controlled for subjecting the grain to the heating and drying process for any desired period and by means of which the grain may be processed by continuous or a batch method through adjustment of the controls on the inlet and outlet of the apparatus.

Various other objects and advantages of the invention will hereinafter become more fully apparent from the following description of the drawings, illustrating a presently preferred embodiment thereof, and wherein:

Figure 1 is a side elevational view, partly in section of the dehydrating and mixing apparatus;

Figure 2 is a view taken at a right angle to Figure 1, substantially along a plane as indicated by the line 2—2 of Figure 1;

Figure 3 is an enlarged fragmentary substantially central vertical sectional view, partly in side elevation of the apparatus, taken substantially at a right angle to Figure 2, and Figure 4 is a cross sectional view of the apparatus taken substantially along a plane as indicated by the line 4—4 of Figure 3.

Referring more specifically to the drawings, the grain dehydrating and mixing apparatus in its entirety is designated generally 5 and preferably includes a supporting surface, designated generally 6 including a platform 7 which is supported in an elevated position by suitable depending supporting legs, one of which is shown at 8 in Figure 1.

A tower 9 is supported adjacent its lower end on the platform 7 and adjacent to one end thereof, said tower 9 including an outer cylindrical casing 10 which is braced and reinforced by uprights 11 which are fastened to the outer side thereof and which extend from end-to-end of the cylindrical casing 10. Said uprights 11 extend below the lower end of the cylindrical casing 10 to provide lower portions forming legs 12 having outturned terminals forming foot members 13 which rest upon and are secured to the platform 7 by fastenings 14 for supporting the tower 9 thereon and in substantially an upright position. The cylindrical casing 10 is provided at its lower end with a restricted cylindrical outlet 15 which extends downwardly through an opening 16 in the platform and which is connected at its upper end by a frusto-conical or funnel shaped portion 17 to the lower end of the casing 10. The lower discharge end of the outlet 15 of the mixing and dehydrating tower 9 terminates in an outturned flange 18 which is connected by fastenings 19 to a substantially horizontally disposed conduit 20 and with the discharge end of the outlet 15 communicating with an opening 21 in the upper portion of the conduit 20. The conduit 20 contains a screw conveyer 22 which is journaled therein and adapted to be driven by suitable means, not shown, for conveying material away from the outlet 15 and in a direction from left to right of Figures 1 and 3. The means by which the material is discharged from the conduit 20 constitutes no part of the present invention and therefore has not been disclosed.

The cylindrical casing 10 is provided with a frusto-conical portion 23 which extends from its upper end and which connects the upper end of the casing 10 to a restricted pipe or conduit 24 through which grain 25 may be fed from any suitable source of supply, not shown, by gravity to the upper end of the tower casing 10, said pipe or conduit 24 preferably being inclined downwardly and toward the tower 9 to above and adjacent the frusto-conical portion 23.

The conduit 24 is provided with a flanged portion 26 defining a slot 27 and groove 28 for slidably receiving a plate 29 forming a valve or closure for regulating the opening of the pipe or conduit 24 adjacent the tower 9. The outlet conduit 15 is similarly flanged as seen at 26a to provide a slot 27a and guide groove 28a for slidably receiving a plate 30 forming a valve or closure for said outlet 15 for regulating the amount of grain being discharged therethrough.

An inner columnar and cylindrical member 31 is disposed within the cylindrical casing 10 and extends longitudinally thereof from near its lower end to adjacent its upper end, said member 31 being rigidly supported within the casing 10 by radial brace rods 32 and diagonal brace rods 33. The radial brace rods 32 extend between the inner columnar member 31 and the outer casing 10 and are bolted to each of said members and at their outer ends are secured by nuts 34 to the uprights 11, as best seen in Figure 4, for fastening said uprights to the casing 10. The diagonal braces 33 extend between the inner member 31 and the frusto-conical portions 17 and 23 for additionally bracing and rigidly positioning said inner member 31 in and substantially axially of the casing 10. Said inner columnar member 31 is likewise cylindrical in shape and is provided with a frusto-conical portion 35 at its upper end and a restricted upper end wall 36. The lower end wall or bottom 37 of the inner member 31 is provided with an opening 38 for receiving one end of a pipe or conduit 39 which opens into said inner member 31. The pipe 39 extends radially outwardly through the cylindrical outer casing 10 and is connected at its opposite end to the outlet of a blower 40, as seen in Figure 1, which is supported on a stand 41 and within a heater casing 42. The stand 41 and heater casing 42 are supported on the opposite end of the platform 7 which likewise supports a suitable heating unit 43 which is disposed within the casing 42 so that the heated air and gases from the heater 43 are drawn into the blower casing through its inlet 44 and are propelled through the outlet of the casing and through the conduit 39 into the inner chamber 45 of the mixing and dehydrating apparatus 9, defined by the inner columnar member 31.

Said inner member 31 is provided with vertically spaced frusto-conical baffles 46 having annular flanges 47 at their restricted ends which are secured by fastenings 48 to the cylindrical wall of the member 31, said frusto-conical baffles 46 extending downwardly and diverging outwardly with respect to the inner member 31 and from their restricted flanged ends 47. The cylindrical wall of the outer casing 10 is provided with vertically spaced frusto-conical baffles 49 which are disposed on the inner side thereof and each of which is provided with an annular flange 50 at its enlarged, upper end which is secured by fastenings 51 to the inner side of the casing 10, said annular baffles 49 extending downwardly and inwardly with respect to the casing 10 and being staggeredly arranged with respect to the baffles 46. The baffles 46 and 49 are disposed in an annular vertical passage 52 formed by the cylindrical wall of the outer casing 10 and the cylindrical wall of the inner columnar member 31.

Said columnar member 31 is provided with vertically and circumferentially spaced openings 53 in the cylindrical wall thereof, a plurality of which open outwardly into the spaces 54 beneath each of the baffles 46. A rod 55 is disposed longitudinally and substantially axially within the inner member 31 and is supported at its upper end on the upper end wall 36 of said member 31 and is preferably supported at its lower end in the upwardly opening socket of a spider 56 having radially opening recesses for receiving the inner ends of the lower radial brace rods 32. A plurality of vertically spaced disks 57 are mounted on the rod 55, said disks having central hub portions 58 through which the rod 55 extends. The disks 57 are adjustably secured to the rod 55 by set screws 59 which extend radially through the hubs 58. Said disks 57 are adapted to be disposed above each group of circumferentially spaced openings 53, for a purpose which will hereinafter become apparent.

The outer casing 10 is provided with circumferentially and vertically spaced openings 60 which are disposed beneath the upper half or bore of the baffles 49 and which communicate with spaces 61 of the annular passage 52, which are located beneath said baffles 49. The openings 60 likewise open to the atmosphere and a shield or hood 62 is mounted over each of said openings 60 and is secured at its upper edge by certain of the fastenings 51 to the outer side of the casing 10 and is flared downwardly and outwardly with respect to said casing 10 for overlying its openings 60, so that the openings 60 are thereby protected by the shields or hoods 62 from rain or moisture entering the passage 52 therethrough, said shields preferably extending downwardly to below the lower edges of the openings 60 from outwardly of which they are disposed.

The outer casing 10 is preferably provided adjacent its lower end with a clean out opening 63 which is normally closed by a hinged door 64.

From the foregoing it will be readily apparent that grain to be mixed and dehydrated or dried may be supplied to the tower 9 from any suitable source by gravity flow through the conduit 24 into the upper end of the outer casing 10. The grain 25 will flow by gravity downwardly through the annular passage 52 and in passing over the upper sides of the baffles 49 and 46, the grain will be deflected inwardly by the baffles 49 toward the inner member 31 and outwardly by the baffles 46 toward the outer casing 10 so that the grain will thereby be agitated or caused to tumble and thoroughly mix. The grain will flow by gravity through the outlet 15 from the tower 9 into the conduit 20 through which it will be conveyed from left to right as seen in Figures 1 and 3 by the screw conveyor 22. Hot air and other heated gases are supplied to the tower 9 through the conduit 39, the heated air and gases from the heating unit 43 being drawn into the blower casing through its inlet 44 and expelled therefrom through the passage 39 into the inner chamber 45. The upwardly traveling hot air and gases will be deflected radially outwardly by the disks 57 toward the openings 53 and said gases will pass outwardly through the openings 53 into the spaces 54 which are void of the material 25 and will then pass upwardly through the tumbling or moving grain 25 to thoroughly mingle therewith for uniformly drying the grain in its downward movement through the passage 52. The heated air and gases which are expelled through the lower group of openings 53 will be required to travel upwardly through the passage 52 before reaching a space 61 which communicates with openings 60 and from which the air and gases can escape to the atmosphere. Said spaces 61 are likewise void of material, as clearly illustrated in Figure 3. The heated air and gases escaping from the chamber 45 through the upper group of openings 53 may escape to the atmosphere through adjacently disposed openings 60. The rate of flow of the grain or material 25 may be controlled by varying the position of the valves 29 and 30 for regulating the size of the inlet and outlet openings of the tower. Likewise, if desired, instead of employing a continuous grain treating process as previously described and wherein the valves 29 and 30 are both disposed in a fully or partially open position, the grain may be treated by a batch process by opening the valve 29 to admit the grain to the tower 9 and with the valve 30 closed and after a predetermined time opening the valve 30 to release the grain from the apparatus and while the valve 29 is closed.

It will be noted that the apparatus 9 is completely closed to the atmosphere except for the shielded openings 60 so that said apparatus may readily be employed out of doors without subjecting the grain to the elements.

Suitable automatic controls may be provided for regulating the heating unit 43, the blower 40 and, if desired, for regulating the valves 29 and 30.

Various modifications and changes are contemplated and may obviously be resorted to, without departing from the spirit or scope of the invention as hereinafter defined by the appended claims. For example, a cooling or refrigerating unit may be utilized in lieu of the heating unit 43 so that a blast of cold air will be expelled by the blower 40 from the casing 42 through the conduit 39 into the inner chamber 45 of the apparatus 9 for cooling the grain.

I claim as my invention:

1. A mixing and dehydrating apparatus comprising a tower including an outer casing and an inner casing, means for supporting said inner casing within the outer casing and substantially axially thereof, said inner and outer casings combining to form an annular material passage therebetween, said outer casing having an inlet at its upper end, a conduit for supplying a finely divided material by gravity to said inlet, said outer casing having an outlet at its lower end for discharge of the material therefrom by gravity, said inner casing being provided with vertically spaced downwardly and outwardly diverging frusto-conical baffles, said outer casing being provided on its inner side with downwardly and inwardly converging frusto-conical baffles, said baffles of the inner and outer casings being disposed in staggered relationship relatively to one another and within the material passage for causing the material passing downwardly therethrough to be deflected inwardly and outwardly toward and away from the walls of the inner and outer casings for agitating and mixing the material, said inner casing defining an upright heat chamber, means for supplying heated air or gases to the lower end of said heat chamber, said inner casing having openings therein opening into the spaces of said material passage located beneath the downwardly diverging baffles for supplying hot air and gases to said passage to mingle with and dry the material passing downwardly therethrough, and said outer casing having openings communicating with the atmosphere and opening into the spaces of the material passage located beneath the downwardly converging baffles and through which the heated air and gases may escape to the atmosphere, a rod disposed axially in and secured to said inner casing, a plurality of vertically spaced baffles mounted on the rod and located above and adjacent each of the openings of the inner casing for deflecting the air outwardly of said openings, and means adjustably securing each of the baffles to the rod for varying the positions of the individual baffles relatively to the adjacent openings of the inner casing.

2. A mixing and dehydrating apparatus comprising a tower including an outer casing and an inner casing, means for supporting said inner casing within the outer casing and substantially axially thereof, said inner and outer casings combining to form an annular material passage therebetween, said outer casing having an inlet at its upper end, a conduit for supplying a finely divided material by gravity to said inlet, said outer casing having an outlet at its lower end for discharge of the material therefrom by gravity, said inner casing being provided with vertically spaced downwardly and outwardly diverging frusto-conical baffles, said outer casing being provided on its inner side with downwardly and inwardly converging frusto-conical baffles, said baffles of the inner and outer casings being disposed in staggered relationship relatively to one another and within the material passage for causing the material passing downwardly therethrough to be deflected inwardly and outwardly toward and away from the wall of the inner and outer casings for agitating and mixing the material, said inner casing defining an upright cooling chamber, means for supplying cold air to the lower end of said cooling chamber, said inner casing having openings therein opening into the spaces of said material passage located beneath the downwardly diverging baffles for supplying cold air to said passage to mingle with and cool the material passing downwardly therethrough, and said outer casing having openings communicating with the atmosphere and opening into the spaces of the material passage located beneath the downwardly converging baffles and through which the cold air may escape to the atmosphere, a rod disposed axially in and secured to said inner casing, a plurality of vertically spaced baffles mounted on the rod and located above and adjacent each of the openings of the inner casing for deflecting the air outwardly of said openings, and means adjustably securing each of the baffles to the rod for varying the positions of the individual baffles relatively to the adjacent openings of the inner casing.

THOMAS L. HINTZ.

REFERENCES CITED

The following references are of record in the file of this patent:

UNITED STATES PATENTS

| Number | Name | Date |
|---|---|---|
| 435,258 | Peregrine | Aug. 26, 1890 |
| 714,843 | Wentz | Dec. 2, 1902 |
| 1,251,573 | Provost | Jan. 1, 1918 |
| 1,445,806 | Toomey | Feb. 20, 1923 |
| 2,299,299 | Bills | Oct. 20, 1942 |